Figure 1:
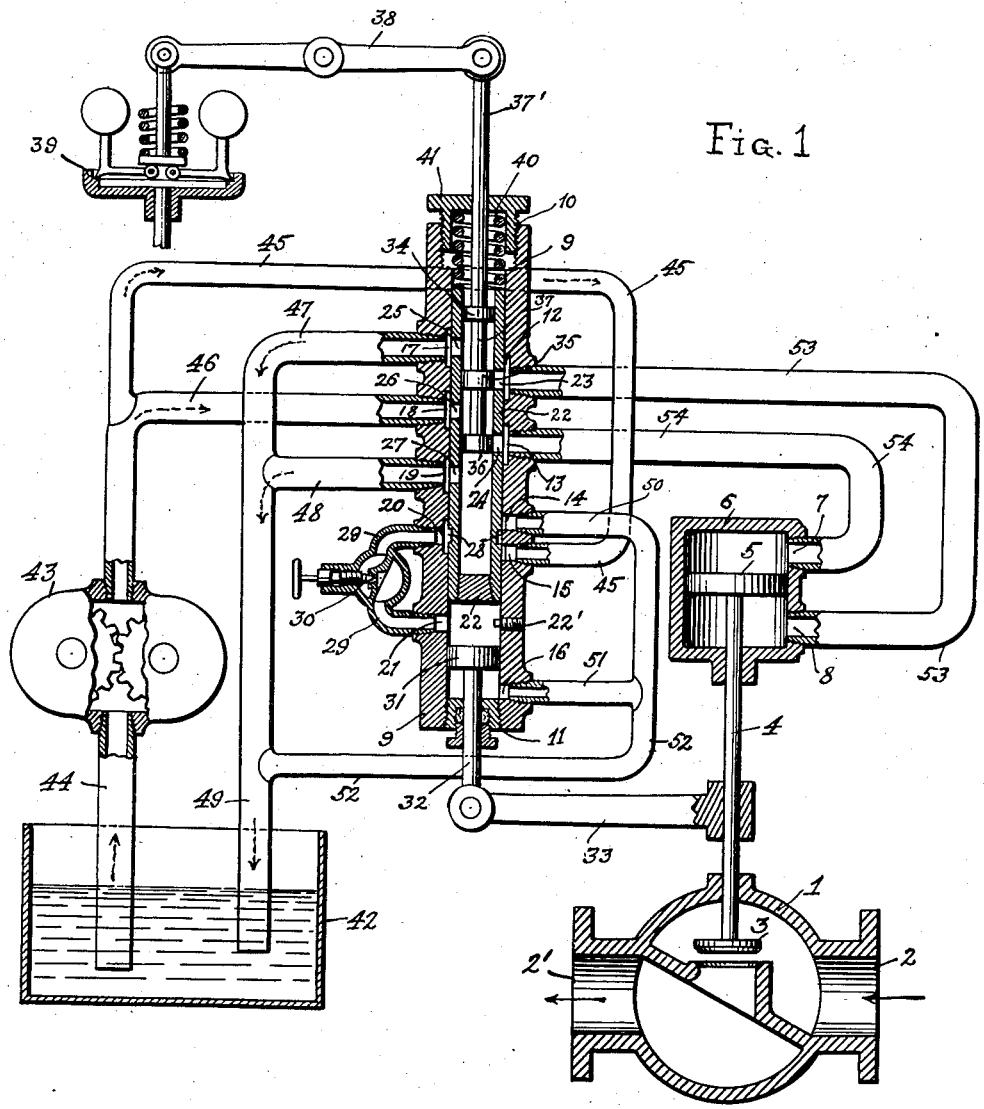

E. D. SPICER.
GOVERNOR FOR ENGINES, MOTORS, OR THE LIKE.
APPLICATION FILED DEC. 15, 1913.

1,109,022.

Patented Sept. 1, 1914.

2 SHEETS—SHEET 1.

Witnesses
J. Milton Jester
H. P. Roberts

Inventor
Elmer D. Spicer,
By W. Schoenborn.
Attorneys

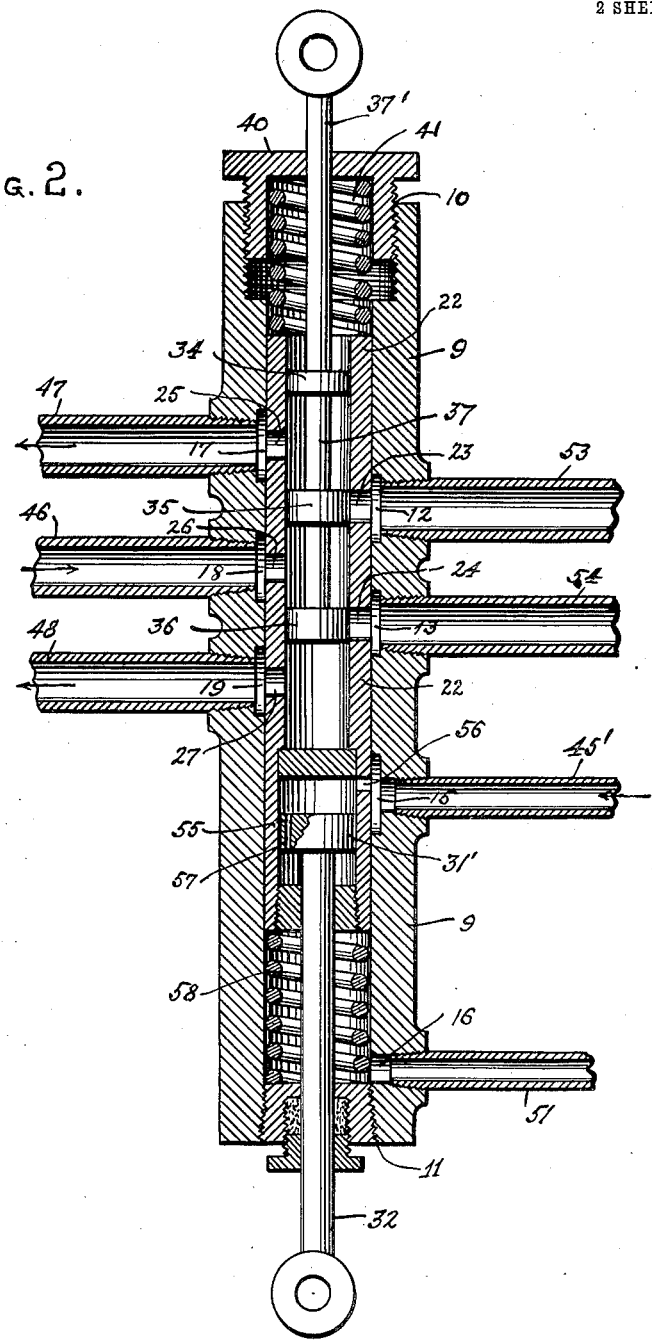

UNITED STATES PATENT OFFICE.

ELMER D. SPICER, OF WELLSVILLE, NEW YORK.

GOVERNOR FOR ENGINES, MOTORS, OR THE LIKE.

1,109,022.

Specification of Letters Patent. Patented Sept. 1, 1914.

Application filed December 15, 1913. Serial No. 806,810.

*To all whom it may concern:*

Be it known that I, ELMER D. SPICER, a citizen of the United States, residing at Wellsville, in the county of Allegany and State of New York, have invented certain new and useful Improvements in Governors for Engines, Motors, or the like, of which the following is a specification.

My invention relates to improvements in regulating devices and more especially of the relay type such as are used to regulate the flow of motive fluid to actuating pistons used to control the movements of valves or regulators which regulate the flow of energy to motors, engines, machines or the like.

The objects of my invention are: First; to construct and arrange the parts of the device so that the fluid is regulated in such a manner as to give a constant speed for all loads, within the capacity of the machine, with only a temporary or momentary fluctuation in speed while the load is changing. Second; to arrange the elements of the apparatus so as to insure the absence of any mechanical connection between the regulator or main valve, and the relay valve, whereby the distance moved through by one is dependent upon the distance moved through by the other. Third; to avoid the use of all floating levers and other similar expedients, which add to the inertia of the moving parts and give an opportunity for lost motion, wear and sticking. Fourth; to construct, arrange and proportion the parts so that a governor of small size may be employed for efficient and reliable operation. Fifth; to allow the use of a governor proper which is adapted for large speed variations and at the same time insure great stability and constant speed of the regulated machine. Sixth; to provide a relay valve that is particularly adapted to a mixed pressure governing, wherein the valve after opening a high or low pressure valve is required to continue its travel and pick up a low or high pressure valve, without, as is usually the case, making the governor too sensitive or the drop of speed too great for satisfactory and stable operation of the motor. Seventh; other objects and advantages of the invention will appear from the detailed description.

The invention consists of structural features and relative arrangements of the elements which will be hereinafter more fully described and particularly pointed out in the appended claims.

In the drawings in which similar reference characters indicate the same parts in the several figures of the drawings: Figure 1 is a view, partly diagrammatic, and partly in section, illustrating the new valve in a complete regulating device; and Fig. 2 is an enlarged central longitudinal section through a modified form of valve.

Referring to Fig. 1 of the drawings 1 is the main valve casing through which passes the fluid supply to the engine or motor, not shown, and desired to be controlled. Said valve casing is provided with the usual inlet 2 and outlet 2', the connecting passageway being controlled by a main valve 3 adjusted to and from its seat by means of a stem 4 attached to a regulating piston 5. The valve 3, stem 4 and piston 5 are rigidly connected and move as one piece. The piston 5 is contained within the cylinder 6 which has a port 7 above the piston and a similar port 8 on the other side of the piston. In the case of electrical machinery the regulating valve would be replaced by a rheostat for controlling the flow of electrical energy, and in the case of other machines by a similar device for controlling the particular form of energy flowing to the machine. 9 is the relay valve casing, cylindrical in shape, and having preferably screw threaded open ends 10 and 11 and ports 12, 13, 14, 15 and 16 on one side and ports 17, 18, 19, 20 and 21 on the other side, constructed and relatively arranged as shown. Within the casing 9 and slidingly fitting the bore of the same is a movable sleeve 22 having an open end at the top and closed lower end. Said sleeve has ports 23 and 24 on one side and ports 25, 26 and 27 on the other side and communicating arranged as shown, with the interior of the sleeve 22. A groove 28 is cut into the outer side near the lower end of the sleeve 22, the edges of said groove just covering adjacent edges of ports 14 and 15 in casing 9, for purposes to be hereinafter described.

Ports 20 and 21 of the casing 9 are in communication and preferably connected by suitable exterior piping 29 whose passageway is controlled by a needle or restricting valve 30. In the lower end of the casing 9 is provided a piston 31 connected with a rod 32 passing through a stuffing box in the lower end 11 of casing 9, said rod being connected to a rigid arm 33 firmly secured to valve stem 4 of the main valve 3. The requirement to be fulfilled in the case of piston 31 is that it be moved by a travel of stem 4 the same distance as valve 3, and in the same direction as the movement of valve 37, as hereinafter explained, which immediately precedes the movement of valve 3 and stem 4 just referred to. This movement of piston 31, is obtained by the arrangement just described, but may be proportional to the movement of valve 3, and may be obtained by any means, such as a lever or levers, serving the same purpose as arm 33. Slidingly fitted within the bore of the movable sleeve 22 is a valve 37 consisting of three connected pistons 34, 35 and 36, attached to a rod 37' passing out of the upper end 10 of the casing, the outer end of said rod 37' being linked by a suitable pivoted lever or levers 38, to any approved form of speed governor, as shown for example by 39, the specific form of which, however, forms no essential part of my invention. Surrounding the rod 37' and resting on the top of the movable sleeve 22 and within the casing 9, is a coiled spring 40, the compression of which and hence the downward pressure upon the sleeve 22, can be regulated by means of an adjustable screw cap 41 engaging the threaded upper end 10 of the casing 9. The downward movement of the movable sleeve 22 is limited by means of a stop 22' for the purpose of preventing overtravel of the ports in the movable sleeve 22, such as would cause said sleeve to become inoperative.

42 is a reservoir or any source of confined fluid supply, and 43 any approved form of pressure pump having its suction inlet connected by means of pipe 44 with said fluid supply or reservoir 42. Pipes 45 and 46 connect the discharge or fluid pressure side of the pump 43 respectively with the ports 15 and 18 of the casing, and the ports 17 and 19 are connected with the fluid supply tank respectively by means of the pipes 47 and 48, which lead to a common drain pipe 49 discharging into tank 42. Ports 14 and 16 of the casing 9 are connected respectively by pipes 50 and 51, and then through pipe 52 and drain 49, to the supply tank 42. In arranging these connections in an actual construction of the device here described there would be one supply line from pump to casing 9 and one drain line from casing 9 to reservoir 42. The distribution of the supply and drain as above explained would be accomplished in the case of each by intercommunicating cored passages in the body of casing 9.

The pipe 53 connects the port 12 of the casing 9 with the lower port 8 of the cylinder 6, and pipe 54 connects the port 13 with the upper port 7. All the ports mentioned in the foregoing description when covered by a valve edge are supposed to be so covered without lap, that is, the part covering the port is to be exactly the same as the port covered where the width is the dimension from edge to edge of the port measured in the direction of valve travel. With such an arrangement, when the valve is covering the port, any motion will cause the port to open.

The system is to be supplied with a fluid put under pressure in a closed system by the pump 43, and the preferred fluid is oil which at the same time not only lubricates all the sliding and wearing parts and prevents the same from rusting or sticking and failure to perform their function, but due to its incompressibility, makes the apparatus sensitive.

In order to clearly comprehend the operation of the device, it will first be necessary to briefly explain the action of the movable sleeve 22 and the piston 31, the two most essential parts of the present invention.

With the sleeve 22 in the central or normal position, as shown in Fig. 1, the piston 31 is held rigidly by the piston 5, for the reason that the pistons 35 and 36 of the valve 37 close the ports 23 and 24, and thereby cut out the ports 12 and 13 in the casing 9 and shut off the fluid supply and pressure from the cylinder 6, confining the fluid within said cylinder 6 on each side of the piston 5, thereby holding the piston stationary. The space between the lower end of the sleeve 22 and the piston 31 is occupied with fluid and the sleeve 22 is held down against this fluid by spring 40. The port 14 in the casing 9 opens to a drain pipe 50, and port 15 is supplied by means of pipe 45, with fluid under pressure, preferably from the same source as supplies fluid to port 26 in the sleeve 22 by means of pipe 46 communicating with the port 18 in the casing. It will then be seen that should the sleeve 22 tend to move upward for any reason the port 14, by means of the groove 28, would be put in communication with the port 20 and the fluid beneath the sleeve 22 would escape by port 21, pipe 29 and valve 30, through the port 14 and pipes 50, 52 and 49 into the supply reservoir 42, and the spring 40 would force the sleeve 22 down until the port 14 was closed and the further escape of the fluid prevented. On the other hand, should the sleeve 22 for any reason or as a result of the motion just described, tend to travel down past its central position shown in the drawings, the port 15 would be opened and fluid pressure would be admitted from pipe 45 through port 15, groove 28, port 20, pipe 29 and valve 30, to the underside of the sleeve 22 and force said sleeve upwardly against the compression of the spring 40 back to its central position where the ports 14 and 15 will be closed, as shown. From this description of the operation of sleeve 22 and piston 31, it will be seen that only in its central position can the sleeve 22 be in equilibrium and that when displaced from this central position even by ever so small an amount, it is returned by the very positive force of the compression of the spring 40, acting on its upper end, or its approximate equal, the fluid pressure on its lower end, and the rapidity with which this return of sleeve 22 is made, is controlled by adjusting the valve 30, and thus the rate at which fluid can be admitted to or escape from beneath sleeve 22. It will also be seen that on account of the spring 40 the sleeve 22 will temporarily follow any movement of piston 31 downward, and on account of the incompressibility of the fluid between its lower end and the piston, will also temporarily be forced up by any upward movement of the piston 31.

The operation of the invention is as follows:—Assume that the different parts of the invention are connected up and in position as indicated in Fig. 1, that the pump 43 is in operation to create a fluid pressure, and that the governor 39 is being rotated by the machine to be controlled which is operating at normal full load. Should this load now be reduced to a fractional part of the full load the speed of the machine would increase and the governor 39 by means of the pivoted link 38 and rod 37' would depress the valve 37 thus allowing the fluid under pressure from pipe 46 to be admitted through ports 26 and 24 of the sleeve 22 and through the pipe 54 to the upper side of the piston 5, and the fluid from the underside of the piston 5 to exhaust through pipe 53, ports 23 and 25, and pipes 47 and 49, to reservoir 42. As a result of this action the piston 5, rod 4 and arm 33 would travel down, and the attached valve 3 would decrease the flow of motive fluid passing through the discharge 2' of the casing 1, to the governed machine. At the same time the piston 31 which is connected to arm 33 would be moved down, and as above explained, the sleeve 22 would follow it. This action would result in a gradual closing of the ports 23 and 24 and finally a position would be reached when said ports 23 and 24 would be covered by the valve 37 which is held depressed by the governor 39, and the amount of fluid admitted by the valve 3 would be just sufficient to operate the machine under the condition of reduced load and the rise of speed which was necessary to produce the required movement of the governor 39 and the valves 37 and 3. When the ports 23 and 24 are closed respectively by the piston sections 35 and 36, no further movement of piston 5 or valve 3 can take place. When the positions and conditions above mentioned are reached however, the sleeve 22 will be out of its central position and the port 15 will be open. As previously explained, fluid will enter through the valve 30 to the under side of sleeve 22 and cause it to be forced upward. This will tend to again open port 24 which will, as above explained, cause a further closing of valve 3 and thus a drop in speed of the machine and governor 39, and a raising of valve 37, which action tends to close ports 23 and 24. This downward movement of the valve 3 will also, through arm 33 and piston 31, cause sleeve 22 to move down and aid the governor 39 in closing ports 23 and 24. The admission of fluid through valve 30 and the movement of the governor 39 and valve 37, piston 31, piston 5, arm 33, and valve 3, just described, will continue until the sleeve 22 reaches its central position when the system will be in equilibrium until another change in load takes place. When the above position is reached the valve 3 will be admitting just enough motive fluid to operate the machine at the fractional load and at the normal or full load speed, as the governor 39 and valve 37 from inherent principles, can occupy only one position for the same speed.

For an increase in load the action is just opposite to that described, the relay valve causing the supply of motive fluid to be varied to suit the demands on the machine and the flow of fluid through the valve 30 causing the additional change necessary to restore the speed of the normal value.

It will be seen, that the action of my improved device, up to the time the flow of fluid through valve 30 to or from the under side of sleeve 22 takes place, is exactly the same as takes place in the ordinary relay valve system with floating levers, namely a change in load causes a variation in speed of the machine and hence a movement of the governor, relay valve and main valve, the relay valve being restored to its central position through suitable linkages by the travel of the valve and thus a position reached, with the change of speed, where the system is again in equilibrium and the amount of motive fluid passed to the machine is just sufficient for the load. However, with the arrangement and invention herein outlined, as soon as the main regulation for power has been completed, the flow of fluid through valve 30 to the under side of sleeve 22 causes an additional regulation which with constant load restores the speed of the regulated machine to its normal value and this ability to hold the speed constant for all loads on the machine is one of the main features of my invention.

It will also be seen that the governor and valve are mechanically separate from the main valve and that the main valve 3 can move through any required distance for only a small movement of the governor 39, and valve 37. For instance, by a succession of movements in the same direction the valve 37 can cause the valve 3 to travel a great distance, or with one movement the same result can be obtained if the valve 37 is held out of its central position for a sufficient time, for as the movement of main valve 3 and piston 5 close the ports 23 and 24, the flow through valve 30 will open them and hence there will be a restricted flow which will cause main valve 3 to travel continuously in the same direction, until the position of valve 37 is varied to close the ports 23 and 24.

From the foregoing description of the operation it will also be seen that the sleeve 22 is temporarily caused to follow the piston 31, but is eventually returned to the same normal position by flow of the fluid pressure through the valve 30 to or from the underside of the sleeve 22, irrespective of the position of the piston 31. The sleeve 22 at the same time, in conjunction with the valve 37, governor 39, and coöperating parts as above explained, controls the flow of motive fluid to the governed machine.

As will be seen from the herewith submitted disclosure of the preferred form of my device and the principles of operation, the objects and advantages of the invention as specified in the statement of invention, are fully and efficiently carried out with an apparatus which is comparatively small, cheap to manufacture, readily installed or taken apart for inspection or repairs, and all the essential parts can be seen during their operation, in order to quickly determine whether said parts are performing their function, and the governor is properly controlling the engine or motor in such a manner as to preserve a constant speed of the same for any load within its capacity.

The modified form of the relay valve shown in Fig. 2 is the same in the essential particulars as that shown in Fig. 1 and the same disclosure as above given applies to the different parts, except instead of providing the ports 20 and 21, pipe connection 29 with its throttling and needle valve 30, shown in Fig. 1, I have extended the movable sleeve 22 and provided the same with a closed cylinder extension 55 having a port 56 connected with pressure pipe 45' and doing away with the port 14 and its drain pipe 50, and placing the piston 31', having the small hole 57 through it, within the closed lower cylinder extension 55, said movable sleeve extension 55 and sleeve 22 being acted upon by a coil spring 58 interposed between the lower end of the extension 55 and bottom of the casing 9, as shown.

In this modification shown in Fig. 2 the small hole 57 through the piston 31' takes the place of valve 30 and the lower spring 58 takes the place of the fluid pressure on the lower end of the movable sleeve 22, shown in Fig. 1. This arrangement can also be further varied by replacing the lower spring 58 shown in Fig. 2, by fluid pressure and having the lower end of the movable sleeve 22 control ports 14 and 15 by a groove 18, as shown in Fig. 1 to keep said sleeve in a central position.

What I claim is:—

1. A device for regulating the flow of motive fluid to the faces of actuating pistons such as are used to regulate the movements of valves or regulators controlling the flow of energy to motors, engines, machines or the like; comprising a valve casing having a plurality of ports adapted to accommodate the motive fluid as it passes to and exhausts from the faces of the actuating piston; a primary valve having a plurality of ports adapted to register with ports in the casing; a secondary valve coacting with the primary valve and adapted to be controlled by a suitable speed governor or similar device, dependent upon the regulated machine, for controlling the ports in the primary valve and the flow of fluid and pressure to and from the faces of the actuating piston; means for causing the primary valve to normally occupy a definite position relative to the valve casing; means independent of but co-acting with the primary valve and adapted to be controlled by the movement of the actuating piston for causing displacement of the primary valve from its normal position; and means for causing the primary valve to return to its normal position when displaced therefrom.

2. A device for regulating the flow of motive fluid to the faces of actuating pistons such as are used to regulate the movements of valves or regulators controlling the flow of energy to motors, engines, machines or the like, comprising a valve casing having a plurality of ports adapted to accommodate the motive fluid as it passes to and exhausts from the faces of the actuating piston; a primary valve having a plurality of ports adapted to register with ports in the casing; a secondary valve co-acting with the primary valve and adapted to be controlled by a suitable speed governor or similar device, dependent upon the regulated machine, for controlling the ports in the primary valve and the flow of fluid and pressure to and from the faces of the actuating piston; means for causing the primary valve to normally occupy a definite position relative to the valve casing; means independent of but co-acting with the primary valve and adapted to be controlled by the movement of the actuating piston for causing displacement of the primary valve from its normal position; means for causing the primary valve to return to its normal position when displaced therefrom; and means for regulating the coöperation between the primary valve and the displacing means and for regulating the time required for the primary valve to return from a displaced to its normal position.

3. A device for regulating the flow of motive fluid to the faces of actuating pistons such as are used to regulate the movements of valves or regulators controlling the flow of energy to motors, engines, machines or the like; comprising a valve casing having a plurality of ports adapted to accommodate the motive fluid as it passes to and exhausts from the faces of the actuating piston; a primary valve having a plurality of ports adapted to register with ports in the casing; a secondary valve co-acting with the primary valve and adapted to be controlled by a suitable speed governor or similar device, dependent upon the regulated machine, for controlling the ports in the primary valve and the flow of fluid and pressure to and from the faces of the actuating piston; means for causing the primary valve to normally occupy a definite position relative to the valve casing; means independent of but co-acting with the primary valve and adapted to be controlled by the movement of the actuating piston for causing displacement of the primary valve from its normal position; means for causing the primary valve to return to its normal position when displaced therefrom; means for regulating the coöperation between the primary valve and the displacing means and for regulating the time required for the primary valve to return from a displaced to its normal position; and means for preventing excessive displacement of the primary valve such as would prevent the otherwise proper performance of the functions ascribed to it.

4. A device for regulating the flow of motive fluid to the faces of actuating pistons such as are used to regulate the movements of valves or regulators controlling the flow of energy to motors, engines, machines or the like; comprising a valve casing having a plurality of ports adapted to accommodate the motive fluid as it passes to and exhausts from the faces of the actuating piston; a primary valve having a plurality of ports adapted to register with ports in the casing; a secondary valve co-acting with the primary valve and adapted to be controlled by a suitable speed governor or similar device, dependent upon the regulated machine, for controlling the ports in the primary valve and the flow of fluid and pressure to and from the faces of the actuating piston; means for causing the primary valve to normally occupy a definite position relative to the valve casing; means independent of but co-acting with the primary valve and adapted to be controlled by the movement of the actuating piston for causing displacement of the primary valve from its normal position; means for causing the primary valve to return to its normal position when displaced therefrom; means for regulating the coöperation between the primary valve and the displacing means and for regulating the time required for the primary valve to return from a displaced to its normal position; means for preventing excessive displacement of the primary valve such as would prevent the otherwise proper performance of the functions ascribed to it and means for preventing the escape of fluid as leakage to the outside of the valve case.

5. A device for regulating the flow of motive fluid to the faces of actuating pistons such as are used to regulate the movements of valves or regulators controlling the flow of energy to motors, engines, machines or the like; comprising a valve casing having a plurality of ports adapted to accommodate the motive fluid as it passes to and exhausts from the faces of the actuating piston; a primary valve having a plurality of ports adapted to register with ports in the casing; a secondary valve co-acting with the primary valve and adapted to be controlled by a suitable speed governor or similar device, dependent upon the regulated machine, for controlling the ports in the primary valve and the flow of fluid and pressure to and from the faces of the actuating piston; means for causing the primary valve to normally occupy a definite position relative to the valve casing; means independent of but co-acting with the primary valve and adapted to be controlled by the movement of the actuating piston for causing displacement of the primary valve from its normal position; means for causing the primary valve to return to its normal position when displaced therefrom; means for regulating the coöperation between the primary valve and the displacing means and for regulating the time required for the primary valve to return from a displaced to its normal position; means for preventing excessive displacement of the primary valve such as would prevent the otherwise proper performance of the functions ascribed to it; means for preventing the escape of fluid as leakage to the outside of the valve case; and means for preventing the accumulation of fluid at such points as would hinder or prevent the otherwise proper performance of the functions ascribed to the various parts of the device.

6. A device for regulating the flow of motive fluid to the faces of actuating pistons such as are used to regulate the movements of valves or regulators controlling the flow of energy to motors, engines, machines or the like; comprising a fixed valve case having a plurality of ports adapted to accommodate the motive fluid as it passes to and exhausts from the faces of the actuating piston; a hollow primary valve slidable within said casing having a plurality of ports adapted to register with corresponding ports in the casing for all allowed relative positions of the valve and casing, said ports in the primary valve extending from the outside surface to the hollow interior of the valve and being adapted to be so controlled by the secondary valve that the rate of flow to or from the faces of the actuating pistons is dependent upon the relative displacement of the valve from the closed position described below, said port being also adapted to form passages for conducting the motive fluid; a cylindrical secondary valve adapted to be controlled by a suitable speed governor or similar device dependent upon the regulated machine, said secondary valve coacting with and within the primary valve for preventing, for one relative position of the primary and secondary valves, the flow of motive fluid to or from the faces of the actuating piston; for allowing, when the primary and secondary valves are relatively displaced in one direction from the position just described, such flow of motive fluid as will cause movement of the actuating piston in one direction, and for allowing when the primary and secondary valves are displaced otherwise than above mentioned, such flow as will cause the actuating piston to have a direction of movement opposite to that ascribed to it above; means for causing the primary valve to normally occupy a definite position relative to the valve casing; means independent of but co-acting with the primary valve and adapted to be controlled by the movement of the actuating piston for causing a temporary movement of the primary valve from the normal position; such movement to bear any desired ratio to the movement of the actuating piston and be for the purpose of decreasing any existing relative displacement between the primary and secondary valves and thus cause a restriction or temporary stoppage of the flow of motive fluid to the actuating piston; means for causing the primary valve to return to its normal position when displaced therefrom, irrespective of the position of the displacing means and independent of any movement of the same, such return being for the purpose of increasing any existing relative displacement between the secondary and primary valves and thus for increasing the flow of motive fluid to and from the actuating piston; means for regulating the coöperation between the primary valve and the displacing means and for regulating the time required for the return of the primary valve from a displaced to its normal position; means for preventing excessive travel of the primary valve such as would prevent the otherwise proper performance of the functions ascribed to it, means for preventing the escape of fluid as leakage to the outside of the valve case; and means for preventing the accumulation of fluid at such points as would prevent the otherwise proper performance of the functions ascribed to the various parts of the device.

In testimony whereof I affix my signature in presence of two witnesses.

ELMER D. SPICER.

Witnesses:
HERBERT LISH,
JOSEF Y. DAHLSTRAND.